United States Patent [19]
Lee

[11] Patent Number: 5,032,279
[45] Date of Patent: Jul. 16, 1991

[54] SEPARATION OF FLUIDS USING POLYIMIDESILOXANE MEMBRANE

[75] Inventor: Chung J. Lee, E. Amherst, N.Y.
[73] Assignee: Occidental Chemical Corporation, Niagara Falls, N.Y.
[21] Appl. No.: 410,375
[22] Filed: Sep. 21, 1989
[51] Int. Cl.$^5$ ............................................. B01D 61/36
[52] U.S. Cl. ...................................... 210/640; 55/16; 210/500.28
[58] Field of Search ........... 428/450; 210/640, 500.39, 210/500.27, 500.28; 55/16, 158

[56] References Cited

U.S. PATENT DOCUMENTS

| Re. 30,351 | 7/1980 | Hoehn et al. | 55/16 |
| 3,440,264 | 4/1969 | McVannel et al. | 260/448.2 |
| 3,789,079 | 1/1974 | Perry et al. | 260/681.5 R |
| 4,378,400 | 3/1983 | Makino et al. | 428/220 |
| 4,440,643 | 4/1984 | Makino et al. | 55/158 X |
| 4,486,376 | 12/1984 | Makino et al. | 264/344 X |
| 4,512,893 | 4/1985 | Makino et al. | 55/158 X |
| 4,532,041 | 7/1985 | Shuey et al. | 585/818 X |
| 4,795,680 | 1/1989 | Rich et al. | 428/450 |

OTHER PUBLICATIONS

Article by G. L. Tullos et al., in Proceeding of 3rd Int'l. *SAMPE* Electronics Conference, p. 219 (1989).
Article by Joseph Haggin in C&EN, May 4, 1987, p. 27, titled "High-Temperature Membrane Separates Gases".

*Primary Examiner*—Frank Spear
*Attorney, Agent, or Firm*—James F. Tao; Richard D. Fuerle

[57] ABSTRACT

Disclosed is a method of separating a first fluid from a mixture with a second fluid by placing the mixture in contact with a polyimidesiloxane membrane. The first fluid preferentially passes through the membrane, thereby separating the fluids. The polyimidesiloxane can be blended with 40 to 99 weight percent polyetherketone. Also disclosed is a fluid separating module comprising a polyimidesiloxane membrane, means for placing a mixture of fluids in contact with only one side of the membrane, and means for collecting fluid that passes through the membrane.

24 Claims, 1 Drawing Sheet

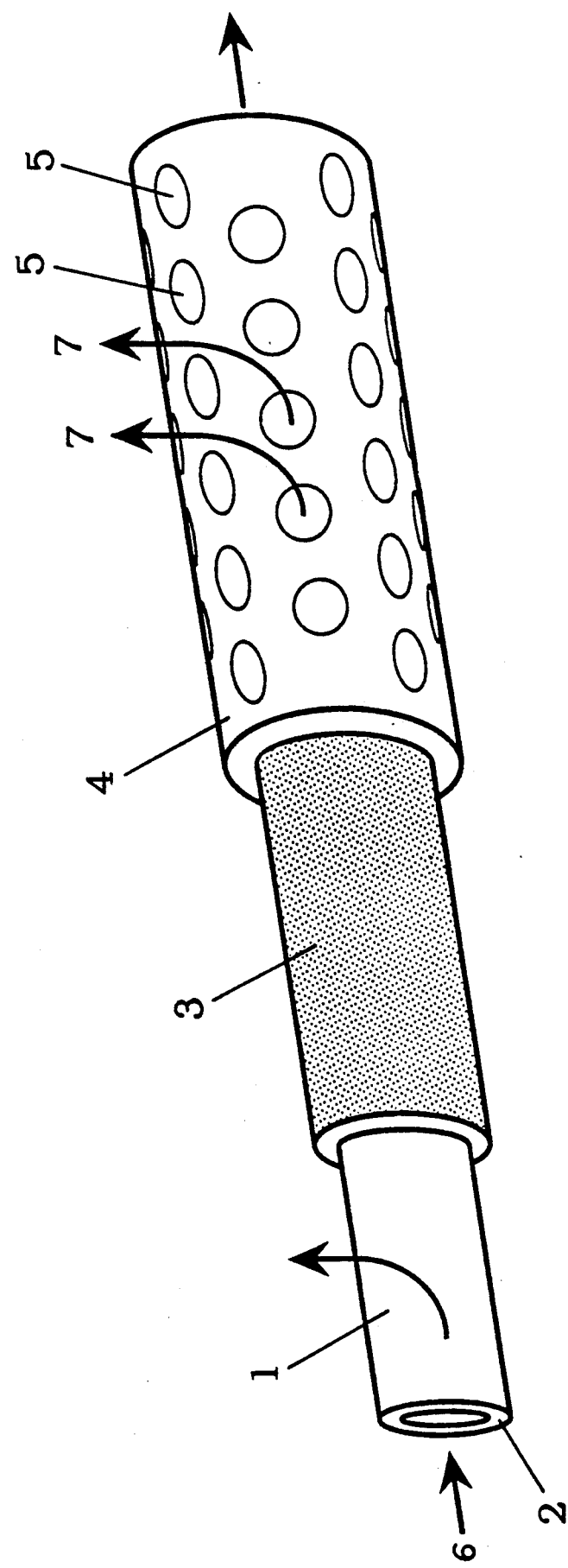

SEPARATION OF FLUIDS USING POLYIMIDESILOXANE MEMBRANE

BACKGROUND OF THE INVENTION

This invention relates to the use of polyimidesiloxane membranes for separating a first fluid from a mixture with a second fluid.

There are many applications where it is desirable to increase or decrease the concentration of a particular fluid in a mixture of fluids. For example, if air is to be used as a source of oxygen in a combustion or other chemical process, it may be economical or otherwise desirable to use air that contains a higher than normal concentration of oxygen. In other processes, it may be desirable to use air that contains a higher concentration of nitrogen. In some industrial processes a mixture of fluids is produced which must be separated into the component fluids. For example, fermentation processes can produce a mixture of ethanol in water. Other processes can produce water containing pollutants such as benzene or chloroform, and these pollutants must be removed from the water before the water can be discharged or recycled.

One relatively economical way of separating two fluids is to place the mixed fluids in contact with a membrane that is more permeable to one of the fluids than to the other. Membranes that have been used for this purpose include polysulfones, polyethersulfones, cellulose acetate, polysiloxanes, and polyimides. The particular chemical composition of the membrane determines the permeability of a fluid to it. However, a complete understanding of the relationship between the chemical composition of the membrane and the permeability of particular fluids has not yet been achieved.

SUMMARY OF INVENTION

I have discovered that membranes made of polyimidesiloxanes (PIS) are particularly useful in separating fluids. While both polyimide membranes and polysiloxane membranes have been used to separate fluids, I have discovered that there is a synergistic interaction between the polyimide and the polysiloxane portion of the membrane so that a polyimidesiloxane membrane is more effective in separating certain fluids than is either a polyimide membrane or a polysiloxane membrane. This synergistic interaction between the imide portion of the membrane and the siloxane portion of the membrane was not predictable from the known properties of polyimide membranes and polysiloxane membranes.

I have also found that when about 60 to about 80 percent by weight of the diamine used to form the PIS is a siloxane diamine the polyimide siloxane membranes are particularly effective in separating chloroform and water, and when about 10 to about 30 percent of the diamine is a siloxane diamine the membranes are particularly effective in separating oxygen and nitrogen. In addition, I have found that a blend of about 1 to about 60% by weight PIS with about 40 to about 99% polyetherketone (PEK) is especially effective in separating oxygen from nitrogen, and has a higher permeability than does a PEK membrane. Finally, the polyimidesiloxane membranes of this invention are also equal to or better than polyfluorovinylidine membranes in separating ethanol and water.

BRIEF DESCRIPTION OF THE DRAWING

The accompanying drawing is a partially cut away isometric view of a certain presently preferred embodiment of a fluid separating module according to this invention.

In the drawing, a polyimidesiloxane membrane 1 in the form of a tube 2 is surrounded by a porous support 3, which is enclosed in a metal cylinder 4 having perforations 5 therethrough. A mixture of fluids 6 enters the inside of tube 2 from the left. Membrane 1 is permeable to one of the fluids 7 in mixture 6 and fluid passes through membrane 1, through porous support 3, and through perforations 5 in metal cylinder 4. In this way, fluid 7 is separated from the remaining fluid 8 in mixture 6.

DESCRIPTION OF THE INVENTION

The polyimidesiloxane membranes of this invention can be prepared according to the well-known reaction of a dianhydride with a diamine, which first proceeds to an intermediate amic acid stage before reaching the final imide product:

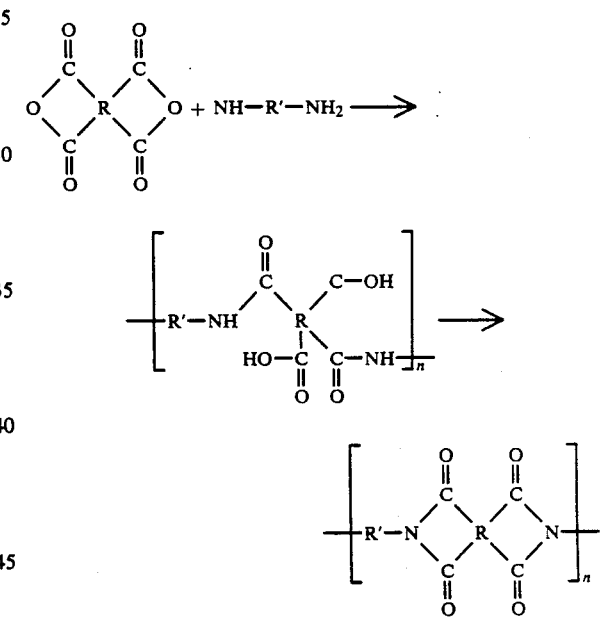

Almost any dianhydride can be used in this reaction. Examples of suitable dianhydrides include: pyromellitic dianhydride, biphenyl dianhydride, benzophenone tetracarboxylic dianhydride, oxydiphthalic anhydride, 2,2-bis(3,4-dicarboxyphenyl)propane dianhydride, 3,3',4,4'-biphenyltetracarboxylic acid dianhydride, 2,2',3,3'-biphenyltetracarboxylic acid dianhydride, bis(3,4-dicarboxyphenyl) ether dianhydride, bis(3,4-dicarboxyphenyl) thioether dianhydride, bisphenol A bisether dianhydride, "6-F" dianhydride (5,5'-[2,2,2-trifluoro-1-(trifluoromethyl) ethylidene] bis-1,3-isobenzofurandione), 2,2-bis(3,4-dicarboxyphenyl) hexafluoropropane dianhydride, 2,3,6,7-naphthalenetetracarboxylic acid dianhydride, bis(3,4-dicarboxyphenyl) sulfone dianhydride, 1,2,5,6-naphthalenetetracarboxylic acid dianhydride, hydroquinone bisether dianhydride, 4,4'-oxydiphthalic anhydride, bis(3,4-dicarboxyphenyl) sulfoxide dianhydride, and 3,4,9,10-perylene tetracarboxylic acid dianhydride. The preferred dianhydrides are 4,4'-oxydiphthalic anhydride, 3,3',4,4'- biphenyl tetracarboxylic acid dianhydride, 3,3',4,4'-benzophenone tetracarboxylic dianhydride, and pyromellitic dianhydride.

The diamine monomer preferably consists of a mixture of about 5 to about 80% by weight siloxane diamine monomer and about 20 to about 95% by weight non-siloxane diamine monomer. If the siloxane diamine is less than 5% of the total diamine monomer, good permeability is hard to achieve, and if the siloxane diamine is over 80% of the diamine monomer, the membrane may have poor mechanical strength. More preferably, the siloxane diamine is about 60 to about 80% by weight of the total diamine monomer and the non-siloxane diamine is about 20 to about 40% by weight if the membrane is to be used for the separation of water and methanol or chloroform, and the siloxane diamine is about 10 to about 30% by weight and the non-siloxane diamine about 70 to about 90% by weight if the membrane is to be used for the separation of oxygen and nitrogen. In separating mixtures of other fluids, the proportion of siloxane diamine to non-siloxane diamine is determined by experiment.

A siloxane diamine is a diamine that contains at least one

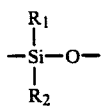

group, where $R_1$ and $R_2$ are organic. Examples of suitable siloxane diamines include compounds having the general formula:

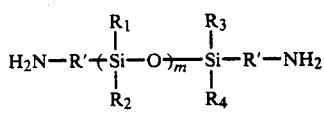

where $R_1$, $R_2$, $R_3$, and $R_4$ are each independently selected from a substituted or unsubstituted aliphatic mono-radical of 1 to 12 carbon atoms or substituted or unsubstituted aromatic mono-radical of 6 to 10 carbon atoms, R' is similar, but is a di-radical, and "m" is about 5 to about 50. Examples of suitable mono-radicals include —CH$_3$,—CF$_3$, —(CH$_2$)$_n$CF$_3$, —C$_6$H$_5$, —CF$_2$—CHF—CF$_3$ and —CH$_2$—CH$_2$—C—O—CHhd 2—CF$_2$CF$_2$CF$_3$, and examples of suitable di-radicals include (CH$_2$)$_n$, (CF$_2$)$_n$, —(CH$_2$)$_n$CF$_2$—, —C$_6$H$_4$—, and X-A-Y (where X and Y are independently selected from O, S, and

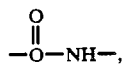

"A" is an aryl di-radical, and "n" is 1 to 10. Because of its availability and low cost, the preferred siloxane diamine is

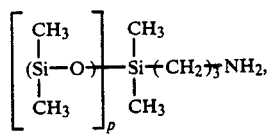

where "p" is 1 to 200, and is preferably 5 to 20.

A non-siloxane diamine is a diamine that contains no

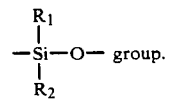

Examples of suitable non-siloxane diamines include m- and p- phenylenediamine, 2,4- and 2,6- diaminotoluene, p- and m-xylylenediamine, diaminobiphenyl, diaminodiphenyl ether, diaminobenzophenone, diaminodiphenyl sulfone, diaminodiphenyl sulfide, diaminodiphenylmethane, dimethylbenzidine, isopropylidenedianiline, bis(p-aminophenoxy)benzene, bis(p-aminophenoxy)-benzene, hexa-, hepta-, nona-, and decamethylenediamines, cyclohexanediamine, bis (4-aminocyclohexyl) methane, trifluoromethyl diaminobenzene, and trifluoromethyl diamino pyridine. The preferred non-siloxane diamines are diaminotoluene, trifluoromethyl diaminobenzene, trifluoromethyl diaminopyridine, diaminodiphenyl ether, diaminobenzophenone, and diaminodiphenyl sulfone because they are readily available and relatively inexpensive.

The dianhydride, the siloxane diamine, and the non-siloxane diamine may be either aliphatic or aromatic. The properties of the membrane are affected by the particular dianhydrides and diamines used in making it, by the proportions of the siloxane diamine to the non-siloxane diamine, by the order of addition of the two diamines to the dianhydride, and by the reaction conditions. Additional information on the materials used to form the membranes of this invention can be found in U.S. Pat. Nos. 4,829,131 and 4,853,452 and my copending application Serial No. 239,372, filed Sept. 1, 1988, now U.S. Pat. No. 4,973,645 herein incorporated by reference.

In a certain presently preferred embodiment of this invention, a blend is formed of the PIS and a polyetherketone (PEK). It has been found that membranes having an optimal mixture of two desirable properties—selectivity for separating oxygen from nitrogen and permeability of oxygen—can be prepared from a blend of about 1 to about 60% by weight PIS and about 40 to about 99% by weight PEK. The blend is formed by mixing, in solution, the PIS (at the amic acid or imide stage) with the PEK, and forming the membrane from that solution. Polyetherketones are polymers containing at least one repeating ether group and at least one repeating ketone group. (See G. L. Tullos et al, in Proceeding of 3rd Int'l SAMPE Electronics Conference, p. 219 (1989)). Examples of suitable PEK's include those containing the repeating unit

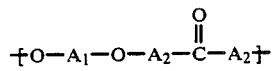

where $A_1$ and $A_2$ are independently selected aromatic di-radicals. Examples of suitable $A_1$ and $A_2$ groups include

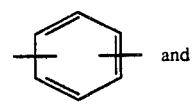

and

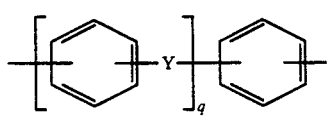

where Y is

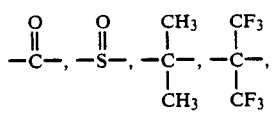

—O— or -- and "q" is 1 to 3; Y can also be

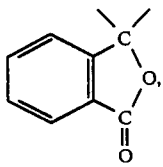

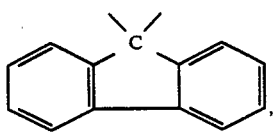

or

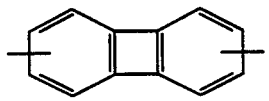

In the preferred PEK's A₁ is

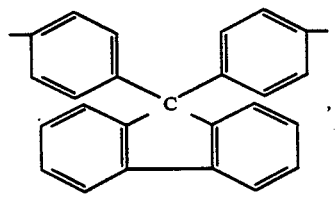

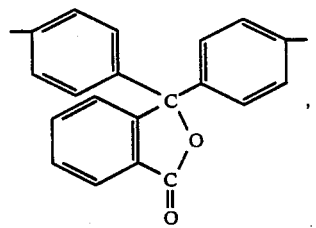

or

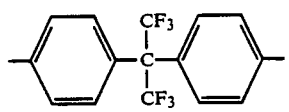

and A₂ is

or

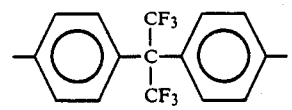

The membranes are made by dissolving the dianhydride and diamines in a suitable solvent, such as N-methyl-2-pyrrolidone (NMP) or tetrahydrofuran (THF); at room temperature they react to the amic acid stage. While the reaction can be carried on to the imide stage in solution, the imide is less soluble than the amic acid, and for some polyimidesiloxanes it may be necessary to stop the reaction at the amic acid stage to keep the polymer in solution. The temperature of reaction necessary to reach the fully imidized stage depends upon the particular components being reacted, but a temperature above the $T_g$ of the polyamic acid in the solid state is usually necessary; for most polysiloxane imides that is a temperature between about 150 and about 400° C. However, in solution, the imidization can be completed at temperatures from 60 to 180° C.

A film is made by casting the polyamic acid or polyimide on a smooth substrate. While it is less expensive to cast the films as polyamic acids, films cast as polyimides tend to have better properties. If the film is cast as a polyamic acid, it is cured on the substrate to a fully imidized product. Examples of suitable substrates include inorganic substrates, such as glass, polymeric substrates such as polytetrafluoroethylene-coated surfaces, and the surface of water or another liquid. If a liquid substrate is used, it can be selected so that the solvent diffuses into the liquid to help remove the solvent from the film.

After evaporation of the solvent the resulting imide film is peeled off or removed from the substrate and can be rolled up or used. The thickness of the film depends on the concentration of the polyamic acid or polyimide in the solvent and films of almost any thickness can be prepared Films having a thickness of about 0.1 to about 10 microns are particularly useful for separating fluids. The films can be cast in a batch process or they can be continuously cast and removed from the substrate. Films of any dimension can be cast.

The films are useful in separating fluids, either gases or liquids. They can be used in pervaporation processes to separate liquids such as azeotropes, and in reverse osmosis processes. In gas processing, the membranes of this invention can be used in producing, separating, recovering, and purifying gases, such as oxygen, nitrogen, sour gas, hydrogen, and biogas. Applications include hydrogen ratio adjustment, hydrogen recovery from NH₃ plant purge streams, hydrogen recovery from hydrogenation processes, $CO_2/CH_4$ natural gas or biogas separations, $CO_2CH_4$ in enhanced oil recovery operations, $H_2S$/gas separation from hydrocarbons, gas dehydration, oxygen enriched air, and nitrogen from air for blanketing/purging. They are particularly useful in separating oxygen and nitrogen and in separating water from ethanol, chloroform, benzene, and other toxic compounds.

The films can be suspended as a flat sheet which can be supported, but it is often useful to form the films into a tube and pass the mixed fluids through the center of the tube. The downstream end of the tube can have a restricted orifice so that the mixed fluid in the tube is under pressure, if desired. While pressure is usually useful in increasing the flux of a fluid through the membrane, occasionally increased pressure will result in a decreased flux. The tubes can also be in the form of small (about 1 to about 10 microns in outside diameter) fibers which can be bunched together longitudinally, if desired.

The following examples further illustrate this invention:

EXAMPLE

A 10% solution of a dianhydride, a siloxane diamine, and a non-siloxane diamine in NMP were reacted at room temperature for about 4 to 16 hours to prepare a polyamic acid siloxane (PAS). The PAS was poured into a tetrafluoroethylene coated dish and was reacted at about 140° C. for about 4 hours, then at 250° C. for about 15 to 30 minutes, to prepare the PIS. The PIS was re-cast on glass and the thin film was heated at 210° C. to evaporate the NMP. The following monomers were used:

The following PIS films were prepared using one mole of the siloxane diamine and a stoichimetric amount of the dianhydride.

TABLE 2

| Sample # | Dianhydride (moles) | Non-siloxane Diamine (moles) | Siloxane Diamine "m" value (moles) |
|---|---|---|---|
| 1 | O (4) | T (3) | 7.5 (1) |
| 2 | O (3.5) | T (2.5) | 9 (1) |
| 3 | O (2) | T (1) | 7.5 (1) |
| 4 | O (2) | T (1) | 12 (1) |
| 5 | O (3) | T (2) | 9 (1) |
| 6 | B (6) | T (5) | 9 (1) |
| 7 | B (4) | T (3) | 9 (1) |
| 8 | B (2) | T (1) | 9 (1) |
| 9 | F (3) | T (2) | 9 (1) |
| 10 | O (2.5) | A' (1.5) | 9 (1) |

Films were tested for the sorption of water, ethanol, and chloroform by immersing a 1"×3" piece of film in at least 10 times its weight of a solution of water containing 10% ethanol or 100 ppm aqueous chloroform at room temperature for 72 hours. The following table gives the results.

TABLE 3

| Sample | Film thickness (mm) | Sorption (g/g) | | | Diffusion Coefficient (cm$^2$/s) | |
|---|---|---|---|---|---|---|
| | | Water ($\times 10^2$) | Ethanol | Chloroform ($\times 10^2$) | Water/Ehtanol ($\times 10^9$) | Water/Chloroform ($\times 10^{10}$) |
| 1 | 12.7 | 1.235 | 1.049 | 1.66 | 0.18 | 9.84 |
| 2 | 30.0 | 0.783 | 0.308 | 1.58 | 2.03 | 61.97 |
| 3 | 22.9 | 0.519 | 1.199 | 1.55 | 2.82 | 89.88 |
| 4 | 18.8 | 0.068 | 0.378 | 1.67 | 16.97 | 94.71 |

The separation factor is the number of grams of a fluid that pass through the membrane for each gram of water that passes through. The separation factor of samples was estimated from sorption measurements. Table 4 gives the results, and compares the results to various commercial membranes.

TABLE 1

| Anhydride | Code | Siloxane Diamine | Non-Siloxane Diamine | Code |
|---|---|---|---|---|
| (diphenyl ether dianhydride structure) | O | $H_2N-(CH_2)_3-[Si(CH_3)_2-O]_m-Si(CH_3)_2-(CH_2)_3-NH_2$ | (toluenediamine structure) | T |
| (benzophenone dianhydride structure) | B | | (phenylenediamine structure) | A' |
| (6FDA structure with CF$_3$ groups) | F | | (diaminotrifluoromethylpyridine structure) | Fp |

TABLE 4

| | Separation Factor | | | |
|---|---|---|---|---|
| | Ethanol | | Chloroform | |
| Sample | Calculated | Observed* | Calculated | Observed* |
| 1 | 8.94 | | 134.30 | |
| 2 | 3.93 | | 201.78 | |
| 3 | 23.00 | | 298.65 | |
| 4 | 55.60 | | 2,455.88 | |

TABLE 4-continued

| | Separation Factor | | | |
|---|---|---|---|---|
| | Ethanol | | Chloroform | |
| Sample | Calculated | Observed* | Calculated | Observed* |
| Polydimethylsiloxane (PDMS) | 9.14 | 8.35 | 103.00 | 560.00 |
| Polyvinyl dimethyl siloxane (PVDMS) | 2.5 | 5.6 | 23.20 | 11.10 |
| Polyvinylidene fluoride (PVDF) | 1.9 | 3.4 | 7.80 | 8.82 |
| Polysulfone cast for NMP | 0.062 | 0.26 | 1.76 | 1.43 |
| Polysulfone cast for THF | 0.337 | 0.03 | 12.90 | 0.82 |
| Ethyl-cellulose (ECN) | 0.62 | 0.4 | 21.56 | 9.20 |
| Polyvinylacetate (PVAc) | 0.005 | — | 3.2 | 0.02 |

*From pervaporation

Table 4 shows that there is a linear correspondence between calculated and observed separation. The table also shows that the PIS samples of this invention are generally far superior to the commercial membranes.

The permeation of samples in ethanol was determined by multiplication of diffusion and sorption. Table 5 gives the sorption, diffusion, sorption times diffusion, and permeability of samples, and corresponding data for commercial membranes:

TABLE 5

| Sample | Sorption (g/g) | Diffusion (cm$^2$/s) | Sorption Times Diffusion (Kg/m · hr) | Permeability (Kg/m · hr) |
|---|---|---|---|---|
| 1 | 1.05 | 0.18 | 6.8 | |
| 2 | 0.31 | 2.03 | 22.7 | |
| 3 | 1.20 | 2.82 | 121.8 | |
| 4 | 0.38 | 16.97 | 232.1 | |
| PVDMS | 0.35 | 7.98 | 100.5 | 21.21 |
| PDMS | 0.30 | 13.9 | 198.5 | 274.38 |
| PVDF | 0.74 | 8.31 | 221.4 | 521.68 |
| ECN | 0.30 | 1.39 | 15.0 | 6.68 |

Table 5 shows that Sample 4 was better than any of the commercial membranes. The above test was repeated using a 100 ppm aqueous solution of chloroform. The following table gives the results.

TABLE 6

| Sample | Sorption (g/g) | Diffusion (cm$^2$/s) | Sorption Times Diffusion (Kg/m · hr) | Permeability (Kg/m · hr) |
|---|---|---|---|---|
| 1 | 1.66 | 9.84 | 0.59 | |
| 2 | 1.58 | 61.96 | 3.52 | |
| 3 | 1.55 | 89.88 | 5.03 | |
| 4 | 1.67 | 94.71 | 5.69 | |
| PVDMS | 4.43 | 219.43 | 3.5 | 0.04 |
| PDMS | 5.38 | 279.13 | 54.1 | 23.08 |
| PVDF | 4.81 | 242.36 | 3.9 | 2.34 |
| ECN | 15.64 | 2.66 | 0.15 | 0.22 |

Table 6 shows that the samples separated chloroform from water.

Sample membranes were prepared as in Example 1 from a blend of PIS Sample 6 and a polyetherketone having the structure

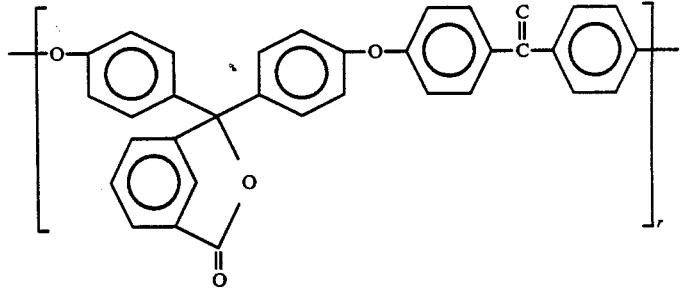

where r=about 20 to 30. Table 7 gives the percent by weight of the polyimidesiloxane in the blend, the gas pressure ($P_H$), the diffusion rate (D), the permeability (P), and the separation factor ($P_OP_N$).

TABLE 7

| | % PIS | N$_2$ | | | O$_2$ | | | |
|---|---|---|---|---|---|---|---|---|
| | | $P_H$(PsiA) | D(10$^{-6}$ cm$^2$/s) | P (barrer) | $P_H$(PsiA) | D(10$^{-6}$ cm$^2$/s) | P (barrer) | $P_O/P_N$ |
| Blend | 0 | 537 | 0.0050 | 0.177 | 551 | 0.020 | 0.780 | 6.68 |
| | | 410 | 0.0045 | 0.116 | 405 | 0.020 | 0.790 | 6.81 |
| | | 315 | 0.0044 | 0.120 | 313 | 0.033 | 0.804 | 6.70 |
| | | 202 | 0.0047 | 0.124 | 212 | 0.018 | 0.812 | 6.55 |
| | | 113 | 0.0041 | 0.129 | 99 | 0.017 | 0.824 | 6.38 |
| | 20 | 522 | 0.0103 | 0.193 | 499 | 0.042 | 1.289 | 6.68 |
| | | 411 | 0.0091 | 0.202 | 404 | 0.041 | 1.291 | 6.40 |
| | | 302 | 0.0091 | 0.206 | 300 | 0.039 | 1.317 | 6.38 |
| | | 201 | 0.0078 | 0.208 | 212 | 0.034 | 1.341 | 6.43 |
| | | 106 | 0.0071 | 0.212 | 105 | 0.034 | 1.340 | 6.32 |
| | 40 | 500 | 0.0108 | 0.273 | 508 | 0.044 | 1.579 | 5.78 |
| | | 405 | 0.0105 | 0.284 | 404 | 0.042 | 1.607 | 5.67 |
| | | 306 | 0.0108 | 0.291 | 319 | 0.041 | 1.610 | 5.53 |
| | | 200 | 0.0144 | 0.322 | 202 | 0.031 | 1.637 | 5.09 |
| | | 103 | 0.0114 | 0.385 | 104 | 0.030 | 1.664 | 4.32 |

TABLE 7-continued

| % PIS | N₂ | | | O₂ | | | $P_O/P_N$ |
|---|---|---|---|---|---|---|---|
| | $P_H$(PsiA) | D(10⁻⁶ cm²/s) | P (barrer) | $P_H$(PsiA) | D(10⁻⁶ cm²/s) | P (barrer) | |
| 60 | 499 | 0.0265 | 0.609 | 533 | 0.127 | 2.975 | 4.89 |
| | 400 | 0.0195 | 0.570 | 408 | 0.094 | 2.902 | 5.09 |
| | 302 | 0.0256 | 0.585 | 315 | 0.079 | 2.932 | 5.01 |
| | 200 | 0.0167 | 0.547 | 201 | 0.078 | 2.894 | 5.29 |
| Polyimide | 200 | — | 0.048 | 200 | — | 0.22 | 4.5 |

Table 7 shows that while the membrane that contained no PIS had a high separation factor, its permeability was too low. Best results were achieved at 60% PIS, where the permeability was substantially higher and the separation factor was not too much lower.

I claim:

1. A method of separating a first fluid from a mixture with a second fluid, comprising placing said mixture on one side of a membrane which comprises a polyimidesiloxane, whereby one of said fluids preferentially passes through said membrane.

2. A method according to claim 1 wherein said membrane is a tube and said mixture flows through the inside of said tube.

3. A method according to claim 2 wherein a multiplicity of said tubes are bundled together longitudinally and each of said tubes is about 1 to about 10 microns in outside diameter.

4. A method according to claim 1 wherein said mixture is under pressure.

5. A method according to claim 1 wherein said membrane is about 0.1 to about 10 microns thick.

6. A method according to claim 1 wherein said polyimidesiloxane is the reaction product of a dianhydride and diamine monomer where said diamine monomer comprises about 5 to about 80% by weight siloxane diamine and about 20 to about 95% by weight non-siloxane diamine.

7. A method according to claim 6 wherein said diamine monomer comprises about 60 to about 80% by weight siloxane diamine and about 20 to about 40% by weight non-siloxane diamine, and said fluids are water and ethanol.

8. A method according to claim 6 wherein said diamine monomer comprises about 10 to about 30% by weight siloxane diamine and about 70 to about 90% by weight non-siloxane diamine, and said fluids are oxygen and nitrogen.

9. A method according to claim 6 wherein said dianhydride is selected from the group consisting of 4,4'-oxydiphthalic anhydride, 3,3', 4,4'-biphenyl tetracarboxylic acid dianhydride, 3,3', 4,4'-benzophenone tetracarboxylic dianhydride, and pyromellitic dianhydride.

10. A method according to claim 6 wherein said siloxane diamine has the formula

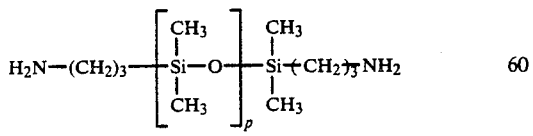

where p is 1 to 200.

11. A method according to claim 6 wherein said non-siloxane diamine is selected from the group consisting of diaminotoluene, trifluoromethyl diaminobenzene, trifluoromethyl diaminopyridine, diaminodiphenyl ether, diaminobenzophenone, diaminodiphenyl sulfone, and mixtures thereof.

12. A method according to claim 1 wherein said first and second fluids are gases.

13. A method according to claim 12 wherein said gases are oxygen and nitrogen.

14. A method according to claim I wherein said first and second fluids are liquids.

15. A method according to claim 14 wherein one of said liquids is water.

16. A method according to claim 15 wherein the other of said liquids is ethanol, chloroform, or benzene.

17. A method according to claim 1 wherein said membrane comprises a polymeric mixture of about 1 to about 60% by weight polyimidesiloxane and about 40 to about 99% by weight polyetherketone.

18. A method according to claim 17 wherein said polyetherketone contains the repeating unit

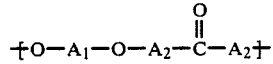

where A₁ and A₂ are independently selected aromatic di-radicals.

19. A method according to claim 18 wherein A₁ is selected from

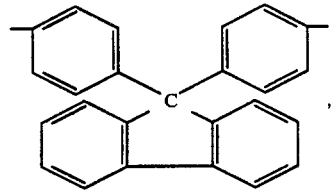

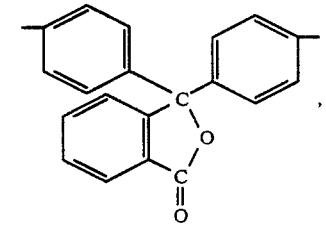

and

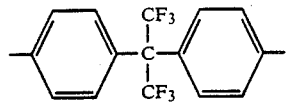

and A₂ is selected from

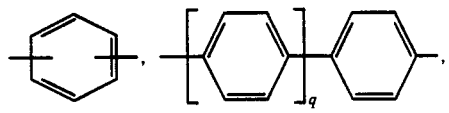

and

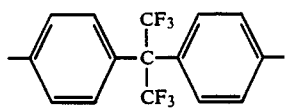

where q is 1 to 3.

20. A fluid separating module comprising
(1) a membrane comprising polyimidesiloxane;
(2) means for placing a mixture of fluids in contact with only one side of said membrane; and
(3) means for collecting fluid that passes through said membrane.

21. A fluid separating module according to claim 20 wherein said membrane is a tube and said mixture is passed through the inside of said tube.

22. A fluid separating module according to claim 21 wherein a multiplicity of said tubes are bundled together.

23. A fluid separating module according to claim 20 wherein said membrane comprises a polymeric mixture of about 1 to about 60% by weight polyimidesiloxane and about 40 to about 99% by weight polyetherketone.

24. A method of changing the ratio of the amounts of two fluids in a mixture comprising placing said mixture on one side of a polyimidesiloxane membrane which comprises the reaction product of a dianhydride, a siloxane diamine, and a non-siloxane diamine, whereby one of said fluids passes through said membrane preferentially to the other end of said fluids.

* * * * *